United States Patent

[11] 3,632,385

| [72] | Inventors | Charles R. Schmitt;<br>James M. Schreyer, both of Oak Ridge, Tenn. |
|---|---|---|
| [21] | Appl. No. | 20,392 |
| [22] | Filed | Mar. 17, 1970 |
| [45] | Patented | Jan. 4, 1972 |
| [73] | Assignee | The United States of America as represented by the United States Atomic Energy Commission |

[54] CARBON COMPOSITE STRUCTURES AND METHOD FOR MAKING SAME
9 Claims, No Drawings

[52] U.S. Cl. .................................................. 117/46 CC, 23/209.1, 23/209.2, 156/78, 156/79, 161/159, 252/62, 264/29
[51] Int. Cl. ....................................................... B41m 5/24, B44c 1/097, C23c 7/00
[50] Field of Search ........................................... 117/46 CA, 46 CB, 46 CC; 252/62; 161/159; 264/29; 156/78, 79

[56] References Cited
UNITED STATES PATENTS

| 3,089,195 | 5/1963 | Woodburn, Jr. ............. | 264/29 X |
|---|---|---|---|
| 3,102,047 | 8/1963 | Rivington ..................... | 117/46 CC |
| 3,302,999 | 2/1967 | Mitchell ....................... | 264/29 X |
| 3,342,555 | 9/1967 | McMillan ..................... | 252/62 X |
| 3,353,994 | 11/1967 | Welsh et al. ................. | 117/46 CB |
| 3,387,940 | 6/1968 | McHenry et al. ............. | 264/29 X |
| 3,416,944 | 12/1968 | Pirrung et al. ................ | 117/46 CC |
| 3,510,323 | 5/1970 | Wismer et al. ................ | 252/62 X |

*Primary Examiner*—Alfred L. Leavitt
*Assistant Examiner*—Kenneth P. Glynn
*Attorney*—Roland A. Anderson ABSTRACT: Porous carbon structures such as honeycomb and reticulated carbon foam contain cavities or interstices which are filled with cellular carbon foam to provide thermal insulating products having relatively high strength-to-weight ratios and structural integrity at high temperatures. A tenacious bond between the carbon foam and the porous carbon structure is attained by impregnating the porous structure with partially polymerized furfuryl alcohol, curing the latter, and then filling the cavities with a carbon foam formulation which includes a binder of partially polymerized furfuryl alcohol. After the foam producing reaction and the curing of the binder the filled structures are heated to a temperature sufficient to carbonize the furfuryl alcohol. The partially polymerized furfuryl alcohol employed as the impregnant and the binder provides the bond between the porous structure and the carbon foam filler.

CARBON COMPOSITE STRUCTURES AND METHOD FOR MAKING SAME

The present invention relates generally to composite carbon structures and more particularly to products comprising carbon structures having cavities therein which are filled with carbon foam and the method of making the carbon-foam-filled products. This invention was made in the course of, or under, a contract with the U.S. Atomic Energy Commission.

High-temperature applications require the use of an insulating material which will retain its structural integrity through a wide range of high temperatures. Cellular carbon foam has proven to be a desirable material for such applications because it is not only an excellent thermal insulator but also of relatively low density, which makes it particularly useful where weight is of concern, such as in aerospace systems. However, cellular carbon foam does not possess sufficient compressive strength and impact resistance to allow it to be used in structural applications with a satisfactory degree of success.

Accordingly, it is the aim or primary objective of the present invention to provide a relatively low-density carbon structure which provides desirable thermal insulating properties similar to cellular carbon foam and yet possesses adequate high-temperature strength and impact shock resistance to be used as structural material. The carbon structure of the present invention comprises a carbon framework, such as honeycomb or reticulated carbon foam, and a filling of cellular carbon foam that is tenaciously bonded to the framework. The carbon framework alone or in combination with the carbon foam filler has a higher strength-to-weight ratio than the cellular carbon foam and together with the latter provides the high-temperature insulation and strength and the impact shock resistance. The carbon structure is prepared or fabricated by impregnating the carbon framework with a thermosetting resin, curing the resin, introducing into interstices or cavities in the framework a foam formulation including the resin, and, after the completion of the foam producing reaction and curing of the foam, heating the foam-containing framework to a temperature sufficient to convert the resin to a carbonaceous state. The bond established between the resin impregnant and the same resin in the foam provides a highly tenacious joint between the foam and the framework to, in effect, produce an integral structure.

The carbon structure employed as the support or framework for the carbon composite may be provided by a carbonized or carbonizable foam in a configuration such as honeycomb, reticulated foam, or foam of any other shape having cavities therein with square, rectangular, cylindrical, conical, or polygonal geometries. This foam is of open porosity and of a configuration as mentioned above for insuring a high strength-to-weight ratio and a greater compressive strength when filled with the cellular carbon foam. For example, the physical properties of honeycomb, particularly with respect to its desirable compressive strength in directions parallel to the side walls of the cavities, are well known. This honeycomb structure, when incorporated in the composite, provides the same features as previously provided by the honeycomb but affords the composite structure with the compressive strength necessary to withstand the loadings and structural applications as mentioned above. Reticulated foam, on the other hand, provides the cellular composite with integral supporting or reinforcing members which provide the composite with the desired compressive strength and impact resistance. The size of the cells in the honeycomb, reticulated foam, and other foams used as the framework is not critical but is somewhat dependent upon the strength desired in the composite in that the finer-celled frameworks provide the greater compressive strengths. The size of the cells may vary anywhere from about 10 cells per linear inch in the reticulated foam up to well over 100 in the foam used in the honeycomb. Of course, in the reticulated foam the cells provide the framework, whereas in the honeycomb the cells provide the struts or walls of the cavities mechanically provided in the honeycomb. The resin impregnant penetrates micropores in the cell walls of the reticulated foam and the honeycomb.

As briefly described above, the composite carbon structure is preferably provided by tenaciously bonding a cellular foam to a supporting framework through the use of partially polymerized furfuryl alcohol as the bonding agent. When employing this material as the bonding agent it is also preferable that the framework as well as the filler of cellular foam be produced from urethanes since the bond therebetween is substantially better than when using other type foams. However, if desired, other thermosetting resins such as truxenes, aldehydes, and the like, may be employed as the impregnating resin and the resin in the foam mixtures. Also, the foams used as the supporting structure may be formed of other materials such as high yield carbon producing organics. Similarly, the foam filler may be provided by using a thermosetting resin and blowing agent as is known in the art.

Described in greater detail, the cellular foam employed in the composite structure as the filler material for the cavities of the framework is a rigid polyurethane foam produced by admixing a binder of partially polymerized furfuryl alcohol with a two-component urethane system and water to provide a foam which is cured and subsequently heated to a temperature sufficient to thermally decompose the urethane and carbonize the furfuryl alcohol binder. The two-component urethane system may be composed of selected urethane chemicals well known in the art for producing cellular urethane products but is preferably a two-component system comprising tolylene diisocyanate and a polyhydric alcohol resin. The reaction of the urethane components is an exothermic reaction which allows a cross linked structure for providing the cellular foam with the desired strength features. The foam, particularly the binder, is cured by heating the foam to about 70° C. for a duration of about 10 hours or by maintaining the foam at room temperature for about 10 to 20 days. The density of the carbon foam and the size of the cells are regulated by the quantities of water used in the admixture and also by the quantity of the thermosetting binder admixed therewith. The density of the carbon foam used as the framework structure and the filler may be in the range of about 0.02 to 0.8 gram per cubic centimeter. Preferably, the framework is made of the higher density foam for the purpose of strengthening the composite, while the filler is of the lower density foam to insure the formation of a lightweight composite with thermal insulating properties. For additional detailed description of the rigid cellular foam preferably employed in the composite, see assignee's U.S. Pat. No. 3,574,548, issued Apr. 13, 1971, and entitled "Rigid Carbon Foam and Process for Manufacturing Same." Further, this application provides a detailed description of the partially polymerized furfuryl alcohol found most desirable for the application in the present invention.

Briefly, the thermosetting resin is partially polymerized furfuryl alcohol which contains a quantity of free or unreacted furfuryl alcohol corresponding to less than 12 percent of the total quantity of molecules in the binder. The exact extent of polymerization which any given quantity of furfuryl alcohol undergoes is very difficult to control and measure. However, for the purpose of this invention the use of gel permeation chromatography, percent of resin solids, viscosity, and hydroxyl numbers together have been found to be reliable mechanisms for determining or estimating the degree of polymerization which is acceptable for producing the carbon foam products envisioned by this invention. For example, selected samplings of the partially polymerized furfuryl alcohol binder employed in the present invention provided data showing less than 12 percent free or unreacted furfuryl alcohol, 75 to 80 weight percent resin solids, a viscosity in the range of 10,000 to 15,000 centipoises at 25° C., and a hydroxyl number in a range of about 100 to 140. The hydroxyl number is preferably in a range of about 130 to about 135. However, if desired, partially polymerized furfuryl alcohol binders having a hydroxyl number lower than 100 may be employed, but care should be exercised when using such binders since their viscosity may be excessively great so as to result in inadequate impregnation, poor mixing of the foam formulation which may cause cracks, large voids, or density variations.

The structures employed as the framework may be prepared in any conventional well-known manner from carbonaceous materials, e.g., cellulose or carbon foam producing materials including the type of foam used as the framework filler. For example, the honeycomb may be prepared by casting the foam formulation in a mold of the desired configuration, while the reticulated foam may be prepared by converting a carbonized cellulose material in the reticulated foam to carbon by the application of heat. In practicing the preferred method of the present invention, the framework, either before or after carbonization, is impregnated with a thermosetting resin consisting of partially polymerized furfuryl alcohol. After impregnating the framework, the excess impregnant is removed in any suitable manner such as by squeezing the framework or be employing centrifugal forces. Of course, after curing the resin impregnant the excess resin from any successive impregnation cannot be removed by squeezing. If the pores in the cell walls are relatively small, the impregnating agent may be diluted with furfuryl alcohol to facilitate the impregnating operation. With the excess impregnant removed, the remaining impregnant is cured by heating the impregnated framework to a temperature of about 100° C. This impregnating-and-curing procedure may be repeated several times, if desired, to insure a tenacious bond between the cellular foam and the framework. After curing the resin in the framework, the above-described cellular foam formulation is poured into the interstices or cavities of the framework, wherein the foam producing reaction occurs to fill the cavities with the polyurethane foam which, as mentioned above, contains a thermosetting binder of partially polymerized furfuryl alcohol. The foam is cured and the composite structure is then subjected in an inert atmosphere to a temperature adequate to convert the cellular foam and the framework, if not already in a carbonaceous state, to carbon. Normally, a temperature of about 900°–1100° C. is adequate to effect this conversion, with the time required being dependent upon the particular size and density of the structure. During the introduction of the foam into the cavities and the curing of the foam, the thermosetting binder in the foam mixture and that in the cell walls, as provided during the impregnating operation, "flow" together or combine to effect the tenacious bond between the two structures which, in effect, provides an integral structure.

In order to provide a more facile understanding of the present invention, an example setting forth a typical operation in the production of a reticulated foam framework in which the cavities or cells are filled with cellular foam is set forth below.

Example

A body of reticulated foam containing 20 pores per linear inch is immersed in a bath consisting of partially polymerized furfuryl alcohol resin containing approximately 2 to 4 weight percent maleic anhydride as a catalyst. The reticulated foam is then removed and the excess furfuryl alcohol is removed from the foam by a squeezing operation. The furfuryl alcohol-containing foam is then heated to a temperature of 100° C. for a duration of approximately 12 hours to cure the furfuryl alcohol. The foam is again introduced into the bath to provide a second impregnation. After removing the foam from the bath, the excess impregnant is removed by employing centrifugal force since the cured resin provided by the first impregnation made the reticulated foam too rigid to squeeze. The above-described steps of impregnating, removing the excess impregnant, and curing the resin are repeated 16 times. Upon a final curing of the resin the reticulated foam is placed in a container and then a urethane foam formulation as described above is introduced into the container to fill the cavities in the reticulated foam with the cellular foam provided by the reaction of the urethane components. After curing the cellular foam, which is achieved by standing at room temperature for a period of 10 days while simultaneously providing the bond between the impregnant and the binder in the foam formulation, the foam-filled framework is placed in an inert atmosphere of argon and heated gradually to 1,000° C. over a 60-hour heating cycle to convert the framework and the foam to a carbonaceous state.

It will be seen that the present invention provides a carbon foam product which is particularly useful in high-temperature applications as an insulator and provides greater structural integrity and impact shock resistance than provided by carbon foams as previously known. The shape of the voids in cellular foam has an effect upon the compressive strength. When the foam rises in the interstices of the framework, the voids are elongated in the vertical direction. The compressive strength in this direction is slightly higher than the compressive strength at right angles to the direction of rise. Also, cellular carbon foam with a bulk density of 0.10 g./cc. and 0.20 g./cc. has compressive strengths of approximately 150 and 700 p.s.i., respectively, On the other hand, a piece of carbon honeycomb having a bulk density of 0.20 g./cc. at a cell height of 2 inches will have a compressive strength of 2,000 p.s.i., while a 5 inch high piece of carbon honeycomb at the same density will have a compressive strength of 1,000 p.s.i. Thus, composite carbon honeycomb segments filled with carbon foam in accordance with the present invention are provided with a compressive strength which is much greater than that of the cellular carbon foam by itself, because of the greater compressive strength of the carbon honeycomb at an equivalent density. A carbon honeycomb at a bulk density of 0.15 g./cc. has a heat flux value of approximately 83 B.t.u.-in./hr./ft.$^2$, while a cellular carbon foam at a density of 0.05 g./cc. has a heat flux value of 36 B.t.u.-in./hr./ft.$^2$. By forming a composite carbon structure from these two carbon materials according to the teachings of the present invention while maintaining each at its respective bulk density, the density of the composite carbon structure is approximately 0.20 g./cc. and the heat flux value is about 55 B.t.u.-in/hr./ft.$^2$. However, carbon honeycomb with a bulk density of 0.20 g./cc. has a much higher heat flux value of 94 B.t.u.-in./hr./ft.$^2$ so as to render the composite carbon structure a much better thermal insulator than carbon honeycomb at the same densities.

While the present invention is primarily directed to the fabrication of carbon composites wherein the framework is filled with cellular carbon foam, other foamlike materials may be employed as the filler. For example, the filler may comprise a syntactic foam admixture of hollow resin microspheres and partially polymerized furfuryl alcohol or other thermosetting resins as described above. The microspheres are preferably about 0.0002 to 0.005 inch in diameter with an average diameter of 0.0017 inch, a bulk density of 6.5 to 9.6 pounds per cubic foot, and formed of the same resin as the resin used for impregnating the framework and for the filler since the bond therebetween is more durable than when using different resins. Also, the microspheres are preferably carbonized after placement in the framework, but can be carbonized before such placement. When using the microspheres as the filler, the quantity of microspheres employed is preferably sufficient to fill the interstices in the framework with the resin used therewith filling the remaining void volume in the framework interstices as formed by the spaces between adjacent microspheres. Additionally, the framework for the carbon composite may be a laminated construction formed of joined layers of reticulated foam of different densities and having different numbers of interstices per unit area. This construction is prepared by selecting layers of the selected densities, each with the desired number of interstices per unit area such as selected from a range of about 10 to 100 interstices per linear inch. The selected layers are placed in a contiguous relationship and then impregnated with the resin. The curing of the resin forms an integral bond between the several layers. After completing the impregnating and resin curing steps, the laminated framework may be filled with a suitable foam filler as described above.

What is claimed is:

1. A method of fabricating a carbon composite of a relatively rigid structural framework of open-porosity carbon and carbon foam in the interstices of the framework, comprising the steps of contacting a carbonaceous framework with a thermosetting resin to impregnate exposed pores in the framework, removing excess resin, curing the resin, filling the interstices in the framework with a foam producing admixture including a thermosetting resin essentially identical to the resin employed in the impregnation step, curing the resin in the admixture and the foam, and thereafter heating the framework containing the foam to a temperature sufficient to convert the thermosetting resin to carbon.

2. The method of fabricating a carbon composite as claimed in claim 1, including the additional steps of successively impregnating the framework and curing the resin after each impregnation prior to filling the interstices with the foam producing admixture.

3. The method of fabricating a carbon composite as claimed in claim 1, wherein the thermosetting resin is partially polymerized furfuryl alcohol.

4. The method of fabricating a carbon composite as claimed in claim 3, wherein the carbonaceous framework and the foam in the framework interstices comprise rigid polyurethane foam.

5. The method of fabricating a carbon composite as claimed in claim 4, wherein the foam producing admixture comprises a two-component urethane system interactable to produce a cellular foam.

6. The method of fabricating a carbon composite as claimed in claim 1, wherein the configuration of the carbonaceous framework is selected from the group consisting of honeycomb and reticulated foam.

7. The method of fabricating a carbon composite as claimed in claim 1, wherein the framework is in a carbonized state prior to impregnating with said thermosetting resin.

8. The method of fabricating a carbon composite as claimed in claim 6, wherein the foam producing admixture consists essentially of said resin and hollow microspheres formed of said resin.

9. The method of fabricating a carbon composite as claimed in claim 6, wherein the framework is formed of at least two layers of reticulated foam having a different number of interstices per unit area, and wherein the layers are bonded together by the resin impregnant upon the curing thereof.

* * * * *